United States Patent [19]

Takeshita

[11] Patent Number: 4,493,209

[45] Date of Patent: Jan. 15, 1985

[54] CONTROL SYSTEM IN A TEST DEVICE FOR TESTING A MANUAL SPEED CHANGE UNIT

[75] Inventor: Hiroshi Takeshita, Kobe, Japan

[73] Assignee: Mitsubishi Denki Kabushiki Kaisha, Tokyo, Japan

[21] Appl. No.: 491,171

[22] Filed: May 3, 1983

[30] Foreign Application Priority Data

May 11, 1982 [JP] Japan .................................. 57-80476

[51] Int. Cl.$^3$ ..................... G01M 17/00; G01M 13/02
[52] U.S. Cl. ..................................................... 73/118
[58] Field of Search .............. 73/507, 510, 118, 432 R

[56] References Cited

PUBLICATIONS

Meiden Jiho No. 149, "Power Train Test System for a Speed Changes Testing Device".

Toyota Gijutsu, vol. 29, No. 3, "Automatic Transaxle Tester".

Primary Examiner—James J. Gill
Attorney, Agent, or Firm—Oblon, Fisher, Spivak, McClelland & Maier

[57] ABSTRACT

The disclosure describes a control system in a test device for testing a manual speed change unit, for vehicle, provided with an input shaft driving means for forcibly driving the input shaft of said manual speed change unit and a clutch placed between the input shaft driving means and the input shaft. Reference data are taken from the revolution speed of said input shaft resulted by changing the speed of said manual speed change unit by operating change of a gear shift while rendering said clutch in a disconnected state, to control the revolution speed of said input shaft driving means and said clutch is brought into a connected state when the revolution speed of said input shaft is synchronized with the revolution of said input shaft driving means.

2 Claims, 3 Drawing Figures

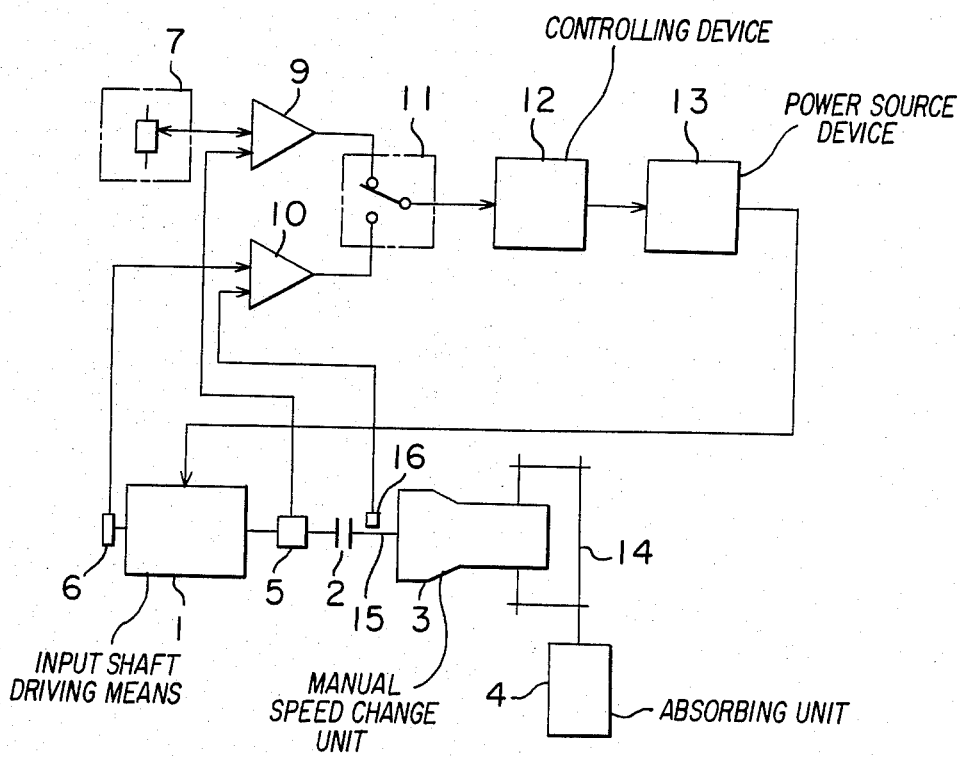

CONTROL SYSTEM IN A TEST DEVICE FOR TESTING A MANUAL SPEED CHANGE UNIT

BACKGROUND OF THE INVENTION

1. Field of the Invention

The present invention relates to a control system in a test device for testing a manual speed change unit. More particularly, it relates to a control system in a test device for testing a manual speed change unit which is mounted on vehicles and so on and which is provided with an input shaft driving means for forcibly driving the input shaft of the manual speed change unit and a clutch unit placed between the input shaft driving means and the input shaft of the manual speed change unit.

2. Description of The Prior Art

The conventional control system in a test device will be described with reference to FIG. 1.

An input shaft driving means (1) such as a motor is connected to a manual speed change unit (3) (referred to as a work hereinbelow) through a clutch (2) and a torque detector (5) and a speed detector (6) for detecting speed of the input shaft driving means are respectively connected to the input shaft driving means (1). The output of a reference torque signal producer (7) is input into a torque operating device (9) along with the output of the torque detector (5), while both outputs of a reference speed signal producer (8) and the speed detector (6) are input into a speed operating device (10). Reference data from the reference torque signal producer (7) and measured data from the torque detector (5) are input in the torque operating device (9) to compare both the data and the reference data from the reference speed signal producer (8) and measured data from the speed detector (6) are also input in the speed operating device (10) to compare both the data. The outputs thus compared are respectively input into a controlling unit (12) through switching operations of a switch (11) whereby a power source unit (13) for the input shaft driving means (1) is controlled. The switch (11) is operated such a manner that the torque operating device (9) is connected to the controlling unit (12) when the clutch (2) is in a connecting state and the speed operating device (10) is connected to the controlling device (12) when the clutch (2) is in a disconnecting state. An output shaft, a coupling device (14) and an absorbing apparatus (4) such as a motor are connected to the work (3) on the output side. The reference number (15) designates an input shaft of the work (3).

FIG. 2 shows variations of the revolution number of the input shaft (15) and the output shaft (14) of the work for each position of the gear shift of the manual speed change unit (3).

The method of controlling the revolution speed of the input shaft driving means (1) in the test device described above will be explained with reference to FIG. 2.

When the work (3) is rotated at the first speed, the revolution number of the output shaft (14) is raised to the point A by a speed control. Thus, the speed control in a certain shift position can be carried out by controlling the revolution speed of the motor when it is used as the absorbing apparatus (4). Then, the revolution number of the input shaft (15) of the work reaches the point $\alpha.A$, assuming that the first speed gear ratio of the work (3) is a constant $\alpha$. When the speed is changed to the second speed by disconnecting the clutch (2) and changing a gear shift, the revolution number of the work input shaft (15) decreases to the point $\beta.A$, assuming that the second speed gear ratio of the work (3) is a constant $\beta$. It is, therefore necessary to reduce the revolution number of the input shaft driving means (1) to the level corresponding to the point $\beta.A$. This is because wearing of the clutch increases if the clutch is connected under the condition that the revolution number of the work input shaft (15) is not coincident with that of the input shaft driving means (1). The same condition applys the change of the gear shift to the third speed or other grade of speed.

In the conventional system, therefore, it has been required to determine a reference revolution number at the speed changing point for each time that the manual speed change unit (3) is subjected to the change of the gear shift under the condition of the clutch (2) disconnected. Accordingly, the reference speed signal producer (8) has been needed to control the revolution speed of the input shaft driving means (1). Namely, when the position of gear shift is changed from the first speed to the second speed, the reference speed signal producer (8) generates the reference signal corresponding to the revolution number at the point $\beta.A$ as shown in FIG. 2.

Thus, in the conventional test device using the control system described above, a reference speed signal producer is needed for an input shaft driving means thereby causing a higher manufacturing cost and a large-sized device.

SUMMARY OF THE INVENTION

An object of present invention is to overcome the disadvantage of the conventional system and to provide an improved control system in a test device for testing a manual speed change unit wherein revolution speed of the input shaft of a work is used as the reference of speed at each speed change point for an input shaft driving means without using a reference speed signal producer for the input shaft driving means.

The foregoing and the other objects of the present invention have been attained by providing a control system in a test device for testing a manual speed change unit, for vehicles, provided with an input shaft driving means for forcibly driving the input shaft of a manual speed change unit and a clutch unit placed between the input shaft driving means and the input shaft wherein the revolution speed of the input shaft at the time of changing speed of the manual speed change unit by changing a gear shift after disconnection of a clutch unit is used as a reference value to control the revolution speed of the input shaft driving means so as to be in synchronism with the revolution speed of the input shaft at the time of the change of the gear shift.

BRIEF DESCRIPTION OF THE DRAWINGS

FIG. 3 is a diagram showing an embodiment of the controlling system in a test device according to the present invention.

DETAILED DESCRIPTION OF THE PREFERRED EMBODIMENT

Figure 1:
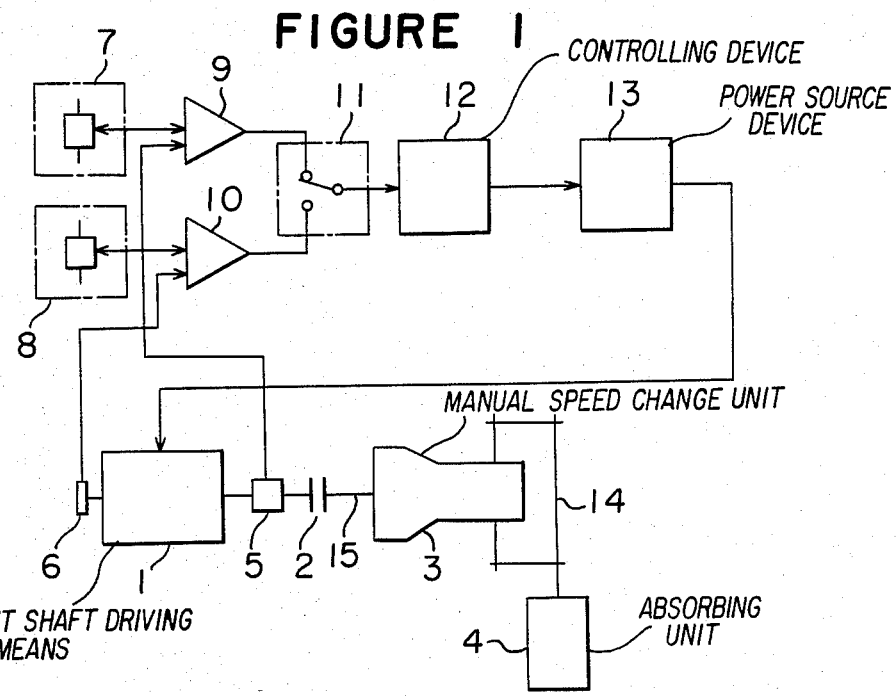
FIG. 1 is a diagram of the conventional system in a test device for a manual speed change unit.

An embodiment of the present invention will be described with reference to FIG. 3. In the figure, the same reference numbers designate the same or corresponding parts.

A speed detector (16) is provided on or near the work input shaft (15) to detect the revolution speed of the same. The output signal of the speed detector (16) is used as reference value for the revolution speed of input shaft driving means (1) and is input into the speed operating device (10). The output signal of the speed detector (6) placed on the driving side of the input shaft driving means (1) is also input into the speed operating device (10) to be compared with the data from the speed detector (16) for detecting speed of the input shaft (15). The data thus compared is fed to the controlling unit (12).

Upon operating change of a gear shift after having disconnected the clutch (2), the revolution speed of the work input shaft (15) is determined by the gear ratio of the work (3) and the revolution speed of the output shaft (14). Therefore, the output of the speed detector (16) in that time is used as a reference signal for the speed at each speed-changing point of the input shaft driving means (1) to control the input shaft driving means (1) so that the revolution speed of the input shaft driving means (1) coincides with that of the work input shaft (15). Thus, when both the revolution speeds of the input shaft driving means (1) and the work input shaft (15) are come to coincident, i.e., in a synchronized state, the clutch (2) is brought into a connected state thereby completing a speed change operation.

Figure 2:
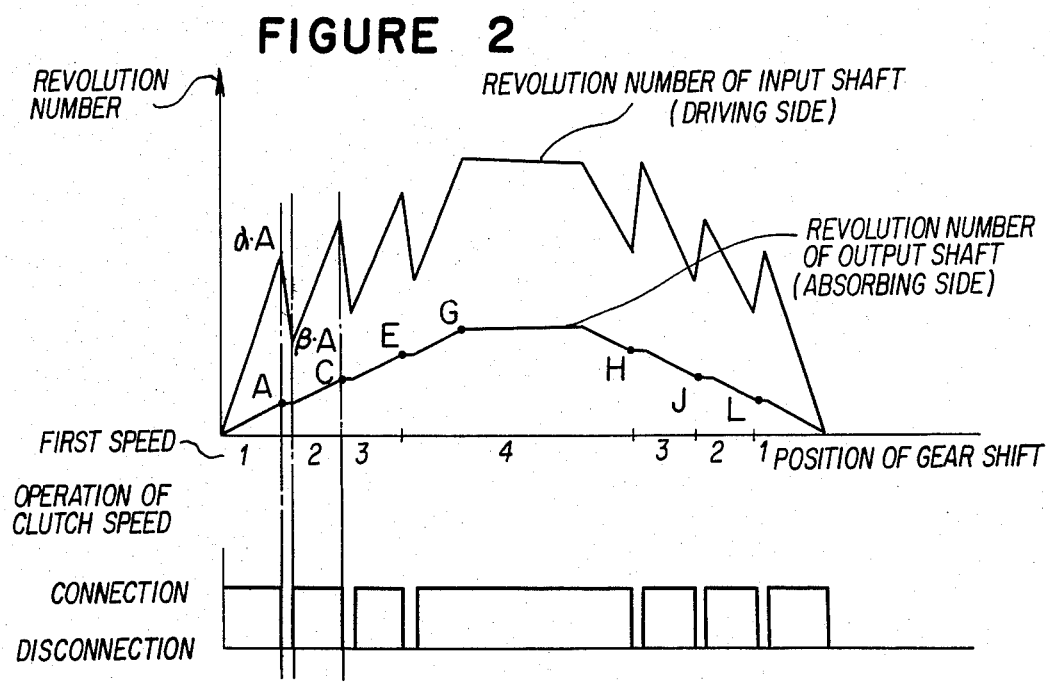
FIG. 2 is a diagram showing a pattern for controlling speeds of the input and output shafts of the manual speed change unit.

FIG. 2 shows speed changing operation of a F/F (front engine/front wheel drive) type vehicle having four stage speed change gears. The present invention is also applicable to F/R (front engine/rear wheel drive) type vehicles having any number of speed change gears.

As described above, in accordance with the present invention, reference speed signal for the input shaft driving means at the time of speed change depends on the revolution speed of the input shaft of a work and accordingly, a test device is manufactured at an economical cost and in a small size and maintenance is easy.

I claim:

1. A control system for a test device for testing a vehicular manual speed change unit having an input shaft, comprising:
   an input shaft driving means for forcibly driving said input shaft of said manual speed change unit;
   a clutch located between said input shaft driving means and said input shaft;
   detector means for detecting the revolution speed of said input shaft and outputting data indicating the change of speed of said manual speed change unit during the disconnection of said clutch; and
   control means responsive to the output of said detector means for controlling the revolution speed of said input shaft driving means in order to provide a synchronization between the revolution speed of said input shaft and the revolution speed of said input shaft driving means when said clutch is in said disconnected connected state.

2. A control system according to claim 1, wherein said detector means comprises:
   a first speed detector located on the input of said input shaft driving means in order to detect the revolution speed of said input shaft driving means; and
   a second speed detector means located on said input shaft in order to detect the revolution speed of said input shaft of said manual speed change unit; and wherein said control means comprises a speed operating device which receives and compares the outputs of said first and second speed detector with the output of said first speed detector acting as a reference data, and wherein said operating device produces an output with said control means further including a means for receiving the output of said speed operating device in order to control the output of a power source unit connected to said input shaft driving means.

* * * * *